(12) United States Patent
Inaba et al.

(10) Patent No.: US 10,792,598 B2
(45) Date of Patent: Oct. 6, 2020

(54) BREATHER

(71) Applicant: HONDA MOTOR CO., LTD., Tokyo (JP)

(72) Inventors: Takahisa Inaba, Wako (JP); Hiroto Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 231 days.

(21) Appl. No.: 15/941,241

(22) Filed: Mar. 30, 2018

(65) Prior Publication Data

US 2018/0280850 A1    Oct. 4, 2018

(30) Foreign Application Priority Data

Mar. 30, 2017 (JP) .................................. 2017-067257

(51) Int. Cl.
  *B01D 45/08* (2006.01)
  *F16H 57/027* (2012.01)
(52) U.S. Cl.
  CPC ........... *B01D 45/08* (2013.01); *F16H 57/027* (2013.01)
(58) Field of Classification Search
  CPC .............................. B01D 45/08; F16H 57/027
  See application file for complete search history.

(56) References Cited

U.S. PATENT DOCUMENTS

| | | | | |
|---|---|---|---|---|
| 4,435,199 A | * | 3/1984 | Potkay ................ | C03B 37/0144 138/44 |
| 4,472,174 A | * | 9/1984 | Chuan ..................... | B03C 3/38 95/58 |
| 4,735,633 A | * | 4/1988 | Chiu ...................... | B01D 53/00 55/315 |
| 5,053,122 A | * | 10/1991 | Carr ......................... | F16N 39/06 210/167.04 |
| 5,122,168 A | * | 6/1992 | Torres ................... | B01D 47/027 55/434 |
| 5,912,368 A | * | 6/1999 | Satarino ................. | B01D 45/08 55/320 |

(Continued)

FOREIGN PATENT DOCUMENTS

| JP | 2008-267581 A | 11/2008 |
|---|---|---|
| JP | 2013-108514 A | 6/2013 |

OTHER PUBLICATIONS

Office Action dated Aug. 28, 2018, issued in counterpart Japanese Application No. 2017-067257 (4 pages).

*Primary Examiner* — Dung H Bui
(74) *Attorney, Agent, or Firm* — Westerman, Hattori, Daniels & Adrian, LLP

(57) ABSTRACT

A breather that allows airflow between an inside and an outside of a casing of an on-vehicle power unit or a transmission mechanism related to the power unit to be performed through a breather chamber structure includes a connecting portion and a cylindrical wall. An ATF-air mixture from the inside of the casing flows into the breather chamber structure through the connecting portion having a tubular shape. The cylindrical wall is provided in the breather chamber structure and has a cylindrical shape having one end portion that is closed and another end portion that is open. The ATF-air mixture from the connecting portion flows from an opening at the other end portion toward the one end portion through the cylindrical wall.

8 Claims, 4 Drawing Sheets

(56) References Cited

U.S. PATENT DOCUMENTS

| | | | | |
|---|---|---|---|---|
| 6,066,209 | A * | 5/2000 | Sajoto | C23C 16/4401 |
| | | | | 118/715 |
| 6,193,802 | B1 * | 2/2001 | Pang | B01D 45/06 |
| | | | | 118/715 |
| 6,402,806 | B1 * | 6/2002 | Schmitt | B01D 53/002 |
| | | | | 423/240 R |
| 6,936,086 | B2 * | 8/2005 | Harkonen | B01D 45/06 |
| | | | | 55/385.1 |
| 6,966,936 | B2 * | 11/2005 | Yamasaki | C23C 16/18 |
| | | | | 55/385.2 |
| 7,803,208 | B2 * | 9/2010 | Kawasaki | B01D 45/06 |
| | | | | 55/434 |
| 9,371,804 | B2 * | 6/2016 | Leonard | F02M 35/08 |

\* cited by examiner

BREATHER

CROSS REFERENCES TO RELATED APPLICATIONS

The present application claims priority under 35 U.S.C. § 119 to Japanese Patent Application No. 2017-067257, filed Mar. 30, 2017, entitled "Breather." The contents of this application are incorporated herein by reference in their entirety.

BACKGROUND

1. Field

The present disclosure relates to breathers used for components installed in vehicles such as, for example, engines, transmissions, and transaxles for allowing airflow between the inside and outside of casings of those components to be performed through the breathers.

2. Description of the Related Art

There are provided breathers through which pressures in casings of on-vehicle engines and casings of main bodies of transmissions, transaxles, and so forth that convert and transmit the torque from the engines are released to the outside. The breathers suppress discharge of oil to the outside of the breathers (see, for example, Japanese Unexamined Patent Application Publication No. 2008-267581).

SUMMARY

A breather described in Japanese Unexamined Patent Application Publication No. 2008-267581 is disposed at a position where water may flow into the breather. Accordingly, it is required that, on the assumption that water flowing into a space inside the breather can be discharged, so-called breather blow of the breather and discharge of high-temperature oil mist from the breather be suppressed.

The present application describes a breather in which air mixed with an atomized liquid ATF can be separated from the liquid in a breather chamber structure.

(1) A breather (for example, a breather 1 to be described later) that allows airflow between an inside and an outside of a casing (for example, a casing 101 to be described later) of an on-vehicle a power source or power unit or a transmission mechanism related to the power unit to be performed through a breather chamber structure (for example, a breather chamber structure 2 to be described later) includes a connecting portion (for example, a connecting portion 16 to be described later) and a cylindrical wall (for example, a cylindrical wall 30 to be described later). A fluid (for example, an ATF-air mixture to be described later) from the inside of the casing flows into the breather chamber structure through the connecting portion having a tubular shape. A cylindrical wall is provided in the breather chamber structure and has a cylindrical shape having one end portion that is closed and another end portion that is open. The fluid from the connecting portion flows from an opening at the other end portion toward the one end portion through the cylindrical wall.

In the breather described above in (1), the fluid from the connecting portion reliably flows into a space inside the cylindrical wall and strikes an inner surface of the cylindrical wall having a cylindrical shape in all directions. This facilitates gas liquid separation of the fluid. Furthermore, the fluid dispersed through the connecting portion strikes the inner surface of a cylindrical wall portion (a cylindrical side wall). This allows the fluid to return into the casing through the connecting portion.

(2) The cylindrical wall may have a cylindrical-wall channel or slit (for example, a first outer cut 321 to be described later) through which a space inside the cylindrical wall and a space outside the cylindrical wall communicate with each other.

In the breather described above in (2), the fluid flows from the space inside the cylindrical wall to the space outside the cylindrical wall. Thus, the occurrences of a situation in which air separated from the fluid remains in the space inside the cylindrical wall can be suppressed.

(3) The breather chamber structure may have an outlet (for example, an exhaust port 2022 to be described later) through which a gas inside the breather chamber structure is discharged to an outside of the breather chamber structure. In this case, the cylindrical-wall channel is formed at a position spaced apart from the outlet by 90 degrees or larger around an axis of the cylindrical wall as a center.

In the breather described above in (3), a larger distance can be reliably obtained between the cylindrical-wall channel and the outlet. As a result, more of the fluid is brought into contact with the cylindrical wall and the like, and accordingly, the gas liquid separation of the fluid is facilitated.

(4) The cylindrical wall may have a multi-cylinder structure that includes at least two cylindrical wall portions (for example, an inner cylindrical wall portion 31 and an outer cylindrical wall portion 32 to be described later). In this case, each of the at least two cylindrical wall portions has a cylindrical-wall-portion channel or slit (for example, an inner cut 311, a first outer cut 321) through which a space inside the cylindrical wall portion and a space outside the cylindrical wall portion communicate with each other. Also in this case, the cylindrical-wall-portion channel (for example, the first outer cut 321 to be described later) of an outermost cylindrical wall portion out of the at least two cylindrical wall portions is formed at a position spaced apart from the outlet by 90 degrees or larger around an axis of the cylindrical wall portion as a center. Also in this case, the cylindrical-wall-portion channel (for example, the inner cut 311 to be described later) of one cylindrical wall portion (for example, the inner cylindrical wall portion 31 to be described later) out of the at least two cylindrical wall portions other than the outermost cylindrical wall portion does not face the cylindrical-wall-portion channel (for example, the first outer cut 321 to be described later) of another cylindrical wall portion (for example, the outer cylindrical wall portion 32 to be described later) out of the at least two cylindrical wall portions immediately outside the one cylindrical wall portion and faces the other cylindrical wall portion in a radial direction of the one cylindrical wall portion.

In the breather described above in (4), a larger distance can be reliably obtained between the cylindrical-wall-portion channels and the outlet. As a result, more of the fluid is brought into contact with the cylindrical wall and a peripheral wall portion, and accordingly, the gas liquid separation of the ATF-air mixture is facilitated.

(5) The breather chamber structure may have an upper half (for example, an upper half 20 to be described later) and a lower half (for example, a lower half 10 to be described later). In this case, an upper end portion of the connecting portion is open upward in the lower half. Also in this case, the cylindrical wall extends downward from the upper half, and the opening at the other end portion of the cylindrical wall faces an opening at the upper end portion of the connecting portion. Also in this case, the upper half has an outlet (for example, the exhaust port 2022 to be described later) through which a gas inside the breather chamber structure is discharged to an outside of the breather chamber structure and which is formed at a position different from a position of the opening at the upper end portion of the connecting portion when seen in an up-down direction.

In the breather described above in (5), the occurrences of a situation in which the fluid having flowed from the connecting portion into the breather chamber structure is directly discharged through the outlet can be suppressed. Furthermore, since the cylindrical wall extends from the upper half, the rigidity of the upper half is increased.

(6) The upper half may have a downward portion (for example, a first extension 2010) formed so as to approach the lower half. In this case, the cylindrical-wall channel is open toward the downward portion so as to cause the fluid to flow from the cylindrical-wall channel in a direction along the downward portion.

In the breather described above in (6), the area of an inner surface of the upper half can be increased. This can increase the area in which the fluid is brought into contact with the upper half. As a result, gas liquid separation of the fluid is facilitated. Furthermore, the rigidity of part of the upper half where the downward portion is provided is increased.

(7) The lower half may be engaged with an attachment (for example, an attachment 1011 to be described later) of the casing. Also, the lower half may be closed by the upper half and the upper half may be secured to the casing.

The breather described above in (7) can be reliably attached to the casing. Thus, gas liquid separation of the fluid is sufficiently performed by the breather. This suppresses the occurrences of breather blow caused by, for example, degradation of defoaming performance of the ATF as the fluid in the casing of a transaxle and allows airflow between the inside and outside of the casing to be performed through the breather chamber structure of the breather.

According to the present application, a breather can be provided in which an air mixed with atomized liquid ATF can be separated from the liquid in a breather chamber structure.

DESCRIPTION OF THE PREFERRED EMBODIMENTS

Figure 1:
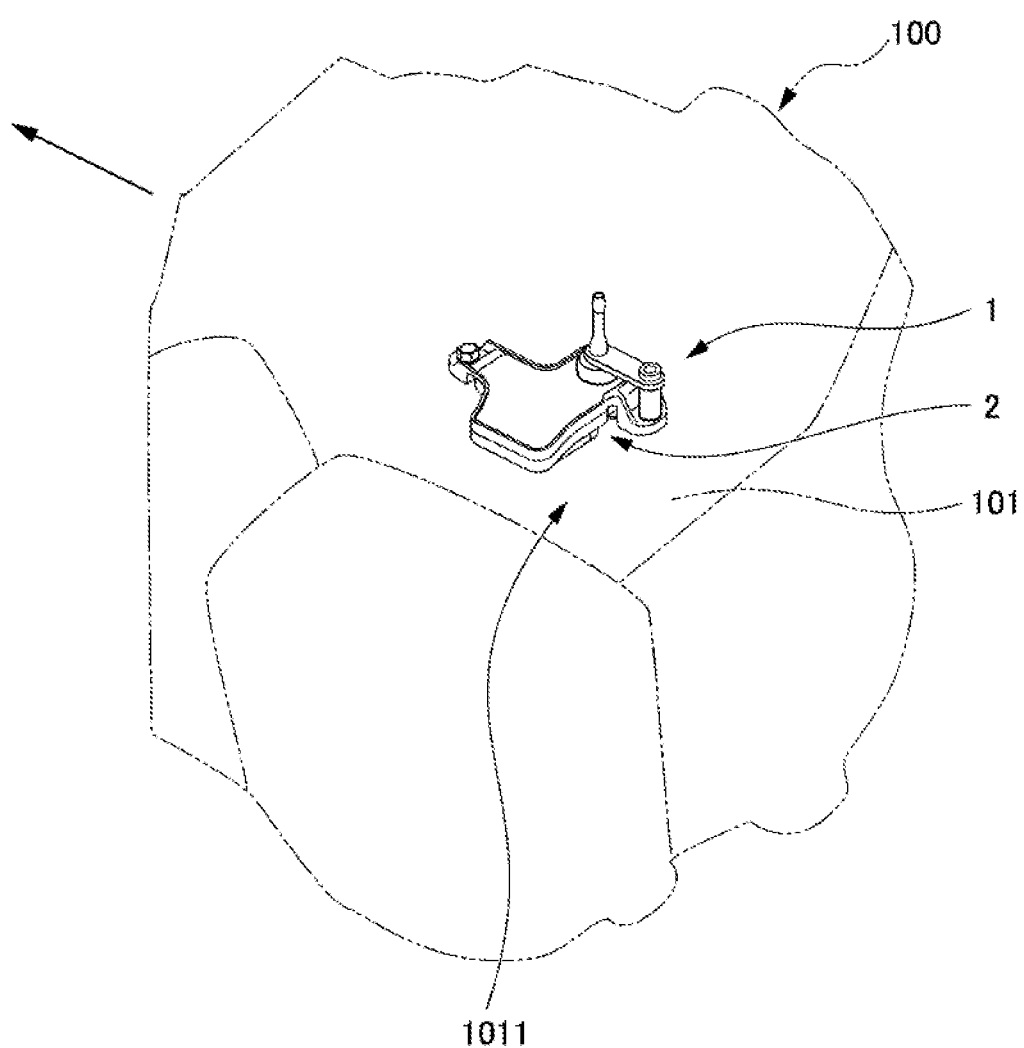
FIG. 1 is a schematic view illustrating a breather as an embodiment of the present disclosure attached to a transaxle.

An embodiment of the present disclosure is described in detail below with reference to the drawings. FIG. 1 is a schematic view illustrating a breather 1 as the embodiment of the present disclosure attached to a transaxle 100.

The breather 1 is attached to a power unit (not illustrated; for example, an on-vehicle power unit) or an attachment 1011 disposed at a specified position in an upper portion of a casing 101 of the transaxle 100, which serves as a transmission mechanism related to the power unit. The transaxle 100 is connected to a power unit such as an engine through a torque converter. A speed change clutch, speed change gears, and a differential (not illustrated) are contained in the casing 101 of the transaxle 100, and the torque converter is filled with an automatic transmission fluid (ATF).

Figure 2:
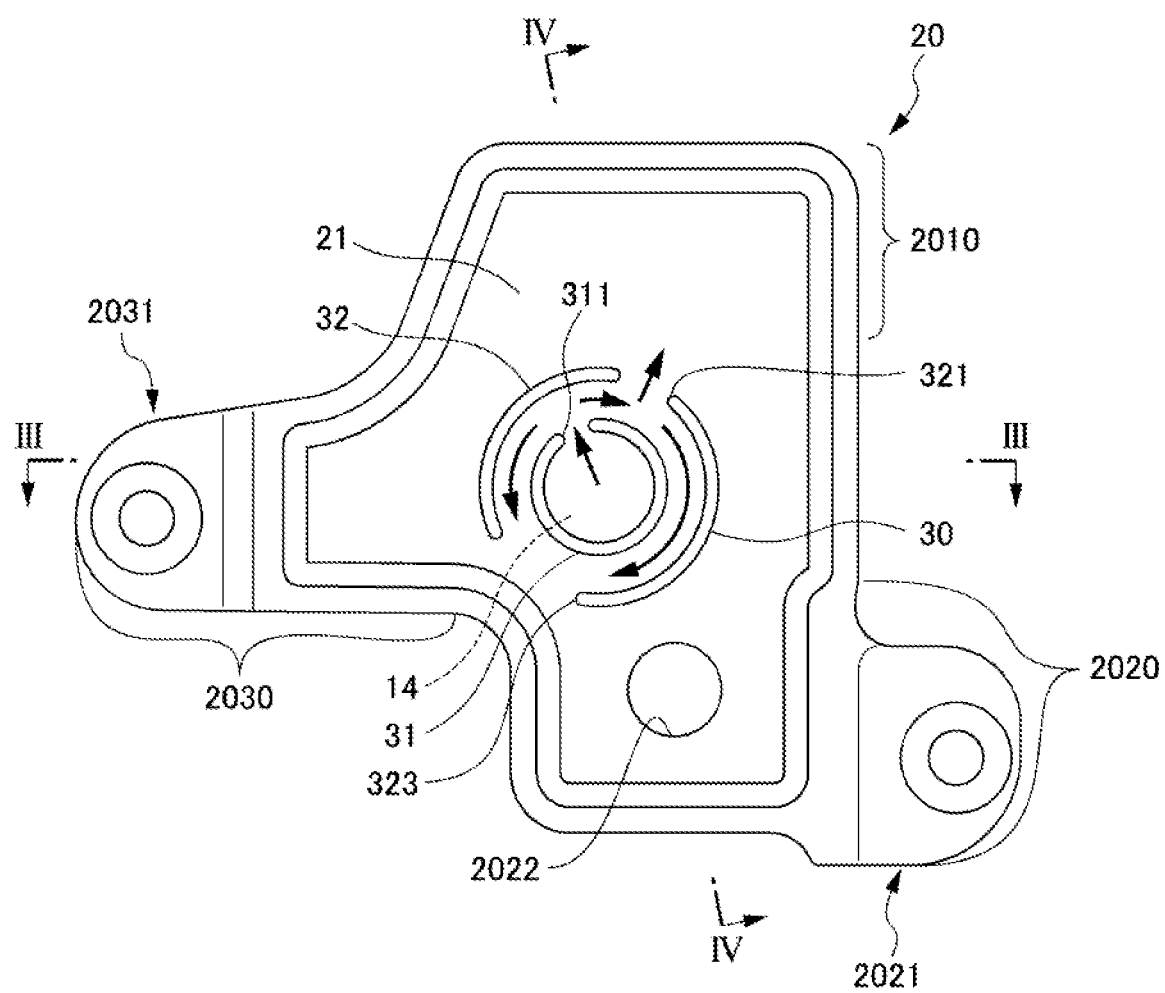
FIG. 2 is a bottom view of an upper half of the breather according to the embodiment of the present disclosure.
Figure 3:
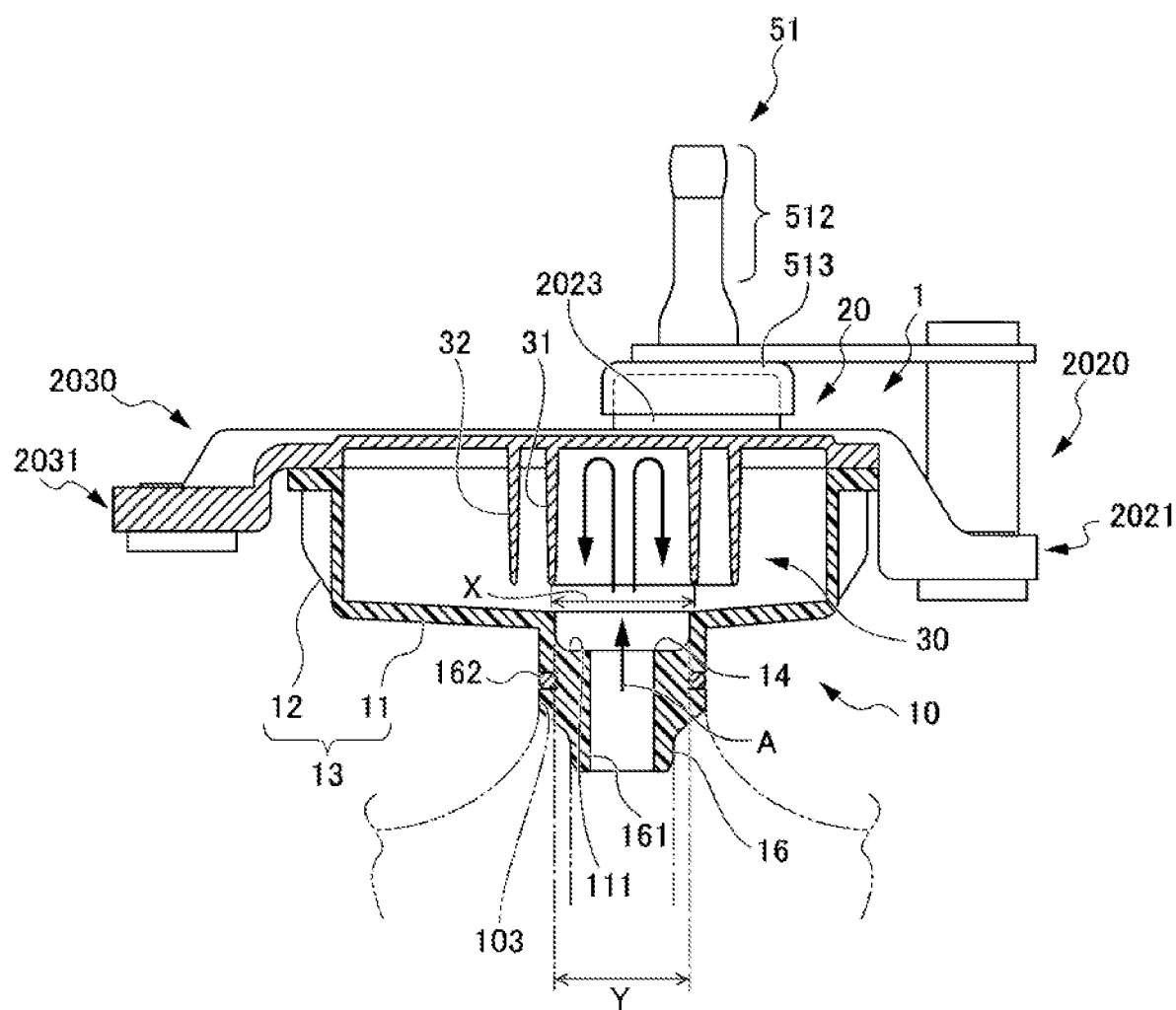
FIG. 3 is a sectional view of the breather according to the embodiment of the present disclosure taken along line III-III in FIG. 2.
Figure 4:
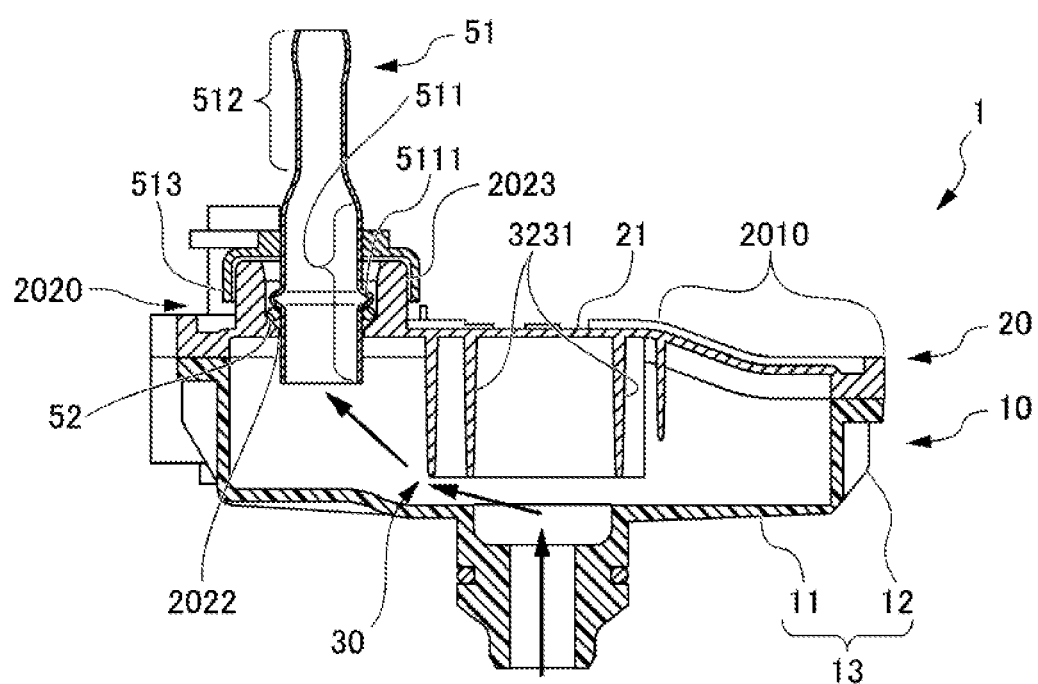
FIG. 4 is a sectional view of the breather according to the embodiment of the present disclosure taken along line IV-IV in FIG. 2.

The breather 1 prevents breather blow caused by, for example, degradation of defoaming performance of the ATF in the casing 101 of the transaxle 100 and allows airflow between the inside and outside of the casing 101 to be performed through a breather chamber structure 2 of the breather 1. As illustrated in FIGS. 2 to 4, the breather 1 includes an upper half 20 and a lower half 10. The upper half 20 and the lower half 10 are formed of resin and included in the breather chamber structure 2. In a normal position in which the vehicle is on a flat place, the breather chamber structure 2 that is, for example, a resin container including the upper half 20 and the lower half 10 is configured in a state in which the upper half 20 positioned on the upper side in the vertical direction and the lower half 10 positioned on the lower side in the vertical direction are coupled to each other.

FIG. 2 is a bottom view of the upper half 20 of the breather 1 according to the embodiment of the present disclosure. FIG. 3 is a sectional view of the breather 1 according to the embodiment of the present disclosure taken along line III-III in FIG. 2. FIG. 4 is a sectional view of the breather 1 according to the embodiment of the present disclosure taken along line IV-IV in FIG. 2.

As illustrated in FIG. 3, the lower half 10 has a container portion 13 that has a bottom plate portion 11 and a peripheral wall portion 12. The peripheral wall portion 12 extends upward from the entire periphery of the bottom plate portion 11. A recessed portion 111 extending downward to a specified depth is formed in part (central portion illustrated in FIG. 3 in the present example) of the bottom plate portion 11. A communication hole 14 communicating to the inside of the casing 101 extends upward at the center of a bottom portion of the recessed portion 111. The recessed portion 111 increases on the lower side the volume of the container portion 13.

Furthermore, the lower half 10 has a tubular (substantially cylindrical) connecting portion 16 that projects downward from a portion of the bottom plate portion 11 where the communication hole 14 is formed. The tubular connecting portion 16 has a channel 161 therein that allows a fluid (for example, air mixed with the atomized liquid ATF (oil mist), which will be referred to as an "ATF-air mixture" hereafter) to flow therethrough. The channel 161 communicates with an opening of the communication hole 14 provided in the bottom plate portion 11 of the lower half 10. Furthermore, an O-ring packing 162 is fitted at a specified position of an outer periphery of the connecting portion 16 so as to maintain airtightness between the connecting portion 16 and the casing 101 along a communication hole 103 formed in the casing 101. This portion of the connecting portion 16 is inserted in the communication hole 103.

The upper half 20 is secured to the lower half 10 such that fluid tightness between a periphery portion of the upper half 20 and a peripheral portion of the lower half 10 is maintained through a sealing member such as a packing (not illustrated). Due to this securing, the lower half 10 is closed by the upper half 20.

As illustrated in FIG. 2, the upper half 20 has a top plate portion 21 having a shape that extends, in bottom view, in three directions from the communication hole 14 of the lower half 10 as the center. Specifically, the top plate portion 21 has a first extension 2010, a second extension 2020, and a third extension 2030 that respectively extend toward the upper side, the lower side, and the left side in FIG. 2 from the communication hole 14 of the lower half 10 as the center.

An extension end portion of the third extension 2030 has a second securing portion 2031 to be secured to the casing 101 by a bolt penetrating therethrough. An exhaust port 2022 is formed near an extension end portion of the second extension 2020. The exhaust port 2022 allows communication between the inside and outside of the container portion 13, that is, between the inside and outside of the breather chamber structure 2. The exhaust port 2022, which is formed at the above-described position, exists at a different position from the position of the communication hole 14 when seen in the up-down direction. A gas in the container portion 13 (for example, air resulting from gas liquid separation in the breather chamber structure 2 (referred to as separated air hereafter)) can be discharged to the atmosphere through the exhaust port 2022. An exhaust-port peripheral projection 2023 is formed at the periphery of the exhaust port 2022. The exhaust-port peripheral projection 2023 projects upward in a cylindrical shape.

Furthermore, the extension end portion of the second extension 2020 has a first securing portion 2021 that projects toward the right side in FIG. 2, that is, in a direction opposite to a direction in which the third extension 2030 extends. The first securing portion 2021 is secured to the casing 101 (see FIG. 1) by a bolt penetrating therethrough. The second securing portion 2031 and the first securing portion 2021 are disposed at lower positions than the top plate portion 21 of the upper half 20 in the vertical direction. Furthermore, the first securing portion 2021 is lower than the second securing portion 2031 in the vertical direction.

As illustrated in FIG. 2, the width of the first extension 2010 (width in the left-right direction in FIG. 2) perpendicular to an upper direction in FIG. 2 in which the first extension 2010 extends is larger than those of the second extension 2020 and the third extension 2030. As illustrated in FIG. 4, the level of the first extension 2010 is gradually lowered in the vertical direction such that the first extension 2010 approaches to the bottom plate portion 11 of the lower half 10 toward the right side in FIG. 4. Accordingly, the height of an inner space of a portion of the breather chamber structure 2 in the first extension 2010 is smaller than the height of the inner space of portions of the breather chamber structure 2 in the second extension 2020 and the third extension 2030. Such a shape of the first extension 2010 increases the rigidity of the upper half 20.

As illustrated in, for example, FIG. 3, the upper half 20 has a cylindrical wall 30 at a portion thereof facing the communication hole 14 of the lower half 10. The cylindrical wall 30 includes an inner cylindrical wall portion 31 and an outer cylindrical wall portion 32 that have respective cylindrical shapes. The lengths of the inner cylindrical wall portion 31 and the outer cylindrical wall portion 32 are the same in the axial direction. The outer cylindrical wall portion 32 is coaxial with the inner cylindrical wall portion 31 and disposed outside the inner cylindrical wall portion 31. Accordingly, the inner cylindrical wall portion 31 and the outer cylindrical wall portion 32 have a multi-cylinder structure including two cylindrical wall portions so as to form the cylindrical wall 30 and provided in the breather chamber structure 2. Lower end portions of the inner cylindrical wall portion 31 and the outer cylindrical wall portion 32 are kept separated from the bottom plate portion 11 of the lower half 10, thereby a gas (for example, the separated air) can pass through a space between the bottom plate portion 11 and the lower end portions of the inner cylindrical wall portion 31 and the outer cylindrical wall portion 32.

An upper end portion of the inner cylindrical wall portion 31 is closed by the top plate portion 21, and a lower end portion of the inner cylindrical wall portion 31 is open. The inner cylindrical wall portion 31 has an inner diameter X that is larger than a diameter Y of the recessed portion 111 of the lower half 10. The inner cylindrical wall portion 31 is coaxial with the recessed portion 111 and the communication hole 14. With this structure, a fluid (for example, the ATF-air mixture) flowing through the communication hole 14 flows into a space inside the inner cylindrical wall portion 31 and strikes an inner surface of the inner cylindrical wall portion 31 and a lower surface of the top plate portion 21. As a result, oil mist of the ATF becomes droplets that drop through the opening at the lower end portion of the inner cylindrical wall portion 31 and return into the casing 101 through the communication hole 14. Furthermore, the ATF dispersed from a transmission through the communication hole 14 strikes the inner surface of the inner cylindrical wall portion 31 and the lower surface of the top plate portion 21, thereby being returned into the casing 101 through the communication hole 14 as is the case with the oil mist of the ATF.

As illustrated in FIG. 2, the inner cylindrical wall portion 31 has a single inner cut 311. The inner cut 311 extends from one end portion to the other end portion of the inner cylindrical wall portion 31 in the axial direction. As illustrated in FIG. 2, in bottom view, the inner cut 311 is formed at a position opposite to the exhaust port 2022 with the axis of the inner cylindrical wall portion 31 interposed therebetween, that is, at a position spaced apart from the exhaust port 2022 by 180 degrees around the axis of the inner cylindrical wall portion 31 as the center. The inner cut 311 defines a cylindrical-wall-portion channel that allows communication between a space inside the inner cylindrical wall portion 31 and a space outside the inner cylindrical wall portion 31.

An upper end portion of the outer cylindrical wall portion 32 is closed by the top plate portion 21, and a lower end portion of the outer cylindrical wall portion 32 is open. An inner diameter of the outer cylindrical wall portion 32 is larger than an outer diameter of the inner cylindrical wall portion 31. The outer cylindrical wall portion 32 is coaxial with the recessed portion 111 and the communication hole 14. The outer cylindrical wall portion 32 has two cuts, that is, a first outer cut 321 and a second outer cut 323.

The first outer cut 321 extends from one end portion to the other end portion of the outer cylindrical wall portion 32 in the axial direction (the upper end portion to the lower end portion of the outer cylindrical wall portion 32). As illustrated in FIG. 2, in bottom view, the first outer cut 321 is formed at a position spaced apart from the inner cut 311 by about 45 degrees toward the exhaust port 2022 in the clockwise direction around the axis of the inner cylindrical wall portion 31 as the center. Accordingly, as illustrated in FIG. 2, the position of the first outer cut 321 is spaced apart from the exhaust port 2022 by 90 degrees or larger around the axis of the inner cylindrical wall portion 31 as the center in bottom view.

That is, the first outer cut 321 is open toward the first extension 2010 so that the ATF-air mixture flows from the first outer cut 321 in a direction along the first extension 2010 (upper direction in FIG. 2). The first outer cut 321 defines a cylindrical-wall-portion channel that allows communication between a space inside the outer cylindrical wall portion 32 and a space outside the outer cylindrical wall portion 32. Furthermore, the first outer cut 321 defines a cylindrical-wall channel that allows communication between a space inside the cylindrical wall 30 and a space outside the cylindrical wall 30.

The second outer cut 323 extends from one end portion to the other end portion of the outer cylindrical wall portion 32 in the axial direction. As illustrated in FIG. 2, in bottom view, the second outer cut 323 is formed at a position spaced apart from the inner cut 311 by about 90 degrees toward the exhaust port 2022 in the counterclockwise direction around the axis of the inner cylindrical wall portion 31 as the center. Accordingly, the outer cylindrical wall portion 32 exists at a position facing the inner cut 311 outside the inner cylindrical wall portion 31 in the radial direction, and the inner cylindrical wall portion 31 exists at positions facing the first outer cut 321 and the second outer cut 323 in the opposite direction. Thus, the inner cylindrical wall portion 31 and the outer cylindrical wall portion 32 form a labyrinth structure.

As illustrated in, for example, FIG. 4, a drain pipe 51 is provided for the exhaust port 2022. The drain pipe 51 is formed by a different unit, that is, a different metal component from the lower half 10 and the upper half 20 included in the breather chamber structure 2. The specific heat of the drain pipe 51 is lower than the specific heat of the lower half 10 and the upper half 20 included in the breather chamber structure 2. The drain pipe 51 has a cylindrical shape, and an inner diameter and an outer diameter of the drain pipe 51 are larger at a lower end portion being one end portion than at an upper end portion being the other end portion. That is, a lower portion of the drain pipe 51 has a large diameter portion 511 and an upper portion of the drain pipe 51 has a small diameter portion 512. The large diameter portion 511 and the small diameter portion 512 are integrally formed and connected to each other.

A tube (not illustrated) can be connected to the small diameter portion 512. The large diameter portion 511 is inserted in the exhaust port 2022. An inner space of the large diameter portion 511 communicates with an inner space of the breather chamber structure 2. The large diameter portion 511 has a small flange portion 5111 at its center. As illustrated in, for example, FIG. 4, an O-ring 52 is disposed at a portion of the large diameter portion 511 closer to the one end portion than the small flange portion 5111. The gap between the exhaust-port peripheral projection 2023 and the large diameter portion 511 is sealed by the O-ring 52.

As illustrated in, for example, FIG. 4, a dome-shaped peripheral projection cover 513 formed of metal is connected to a portion of the large diameter portion 511 where the large diameter portion 511 is connected to the small diameter portion 512. The peripheral projection cover 513 covers the entirety of the exhaust-port peripheral projection 2023 from the outside of the breather chamber structure 2 (from the upper side in the vertical direction).

The breather 1 structured as described above functions as follows. First, when the pressure in the casing 101 increases due to an increase in temperature of the ATF to a higher value than an assumed value, the ATF-air mixture flows from the casing 101 into the inner space of the breather chamber structure 2 of the breather 1 through the communication hole 14 of the connecting portion 16 as illustrated by an arrow A in FIG. 3. Then, the ATF-air mixture flows into the space inside the inner cylindrical wall portion 31 through the opening at the lower end portion of the inner cylindrical wall portion 31.

Since the upper end portion of the inner cylindrical wall portion 31 is closed, the ATF-air mixture having flowed into the space inside the inner cylindrical wall portion 31 flows out through the inner cut 311 and flows into a space between the inner cylindrical wall portion 31 and the outer cylindrical wall portion 32. At this time, the outer cylindrical wall portion 32 exists at a position facing the inner cut 311 outside the inner cylindrical wall portion 31 in the radial direction. Thus, the ATF-air mixture flows through the space between the inner cylindrical wall portion 31 and the outer cylindrical wall portion 32 and reaches the first outer cut 321 and the second outer cut 323. That is, gas liquid separation of the ATF-air mixture is facilitated in the cylindrical wall 30 having a labyrinth structure.

The ATF-air mixture having reached the first outer cut 321 flows to the outside of the cylindrical wall 30 through the first outer cut 321 and flows toward the upper side in FIG. 2. Regarding this upper side in FIG. 2, the level of the first extension 2010 is gradually lowered in the vertical direction such that the first extension 2010 approaches the bottom plate portion 11 of the lower half 10 toward this upper side in FIG. 2. Accordingly, the first extension 2010 has a large area, and the liquid ATF contained in the ATF-air mixture becomes droplets on the lower surface of the first extension 2010. Thus, the gas liquid separation of the ATF-air mixture is facilitated. Then, the air sufficiently separated from the liquid flows on the right side of the outer cylindrical wall portion 32 in FIG. 2 so as to moving around the outer cylindrical wall portion 32 in FIG. 2, reaches the exhaust port 2022 on the lower side in FIG. 2, and is discharged to the outside of the breather chamber structure 2 through the exhaust port 2022.

The ATF-air mixture having reached the second outer cut 323 flows to the outside of the cylindrical wall 30 through the second outer cut 323 and flows toward the lower left side in FIG. 2. The peripheral wall portion 12 of the lower half 10 exists on this lower left side in FIG. 2, and the ATF-air mixture strikes the peripheral wall portion 12. The gap between the peripheral wall portion 12 and a portion of the outer cylindrical wall portion 32 where the second outer cut 323 is formed is far smaller than the width of the first outer cut 321. Accordingly, a small amount of the ATF-air mixture passes through this gap, the gas liquid separation is facilitated, and the air separated through the gas liquid separation flows toward the exhaust port 2022. Then, the air sufficiently separated from the liquid reaches the exhaust port 2022 on the lower side in FIG. 2 and is discharged to the outside of the breather chamber structure 2 through the exhaust port 2022.

According to the present embodiment, the following advantageous effects are obtained. According to the present embodiment, the breather 1 that allows airflow between the inside and the outside of the casing 101 of the on-vehicle power unit or the transmission mechanism related to the power unit to be performed through the breather chamber structure 2 includes the connecting portion 16 and the cylindrical wall 30. The ATF-air mixture from the inside of the casing 101 flows into the breather chamber structure 2 through the connecting portion 16 having a tubular shape. The cylindrical wall 30 is provided in the breather chamber structure 2 and has a cylindrical shape having the one end portion that is closed and the other end portion that is open. The ATF-air mixture from the connecting portion 16 flows from an opening at the other end portion toward the one end portion through the cylindrical wall 30.

Accordingly, the ATF-air mixture as the fluid from the connecting portion 16 reliably flows into the space inside the cylindrical wall 30 and strikes the inner surface of the cylindrical wall 30 having a cylindrical shape in all directions. This facilitates gas liquid separation of the ATF-air mixture. Furthermore, the ATF dispersed from the transmission through the communication hole 14 strikes the inner surface of the inner cylindrical wall portion 31 and the lower surface of the top plate portion 21. Thus, the ATF can be returned into the casing 101 through the communication hole 14 as is the case with the oil mist of the ATF.

Furthermore, the cylindrical wall 30 has the first outer cut 321 as a cylindrical-wall channel through which the space inside the cylindrical wall 30 and the space outside the cylindrical wall 30 communicate with each other. Accordingly, the ATF-air mixture flows from the space inside the cylindrical wall 30 to the space outside the cylindrical wall 30. Thus, the occurrences of a situation in which air separated from the ATF-air mixture remains in the space inside the cylindrical wall 30 can be suppressed.

Furthermore, the breather chamber structure 2 has the exhaust port 2022 through which the gas inside the breather chamber structure 2 is discharged to the outside of the breather chamber structure 2. The first outer cut 321 as the cylindrical-wall channel is formed at a position spaced apart from the exhaust port 2022 by 90 degrees or larger around the axis of the cylindrical wall 30 as the center. Thus, a larger distance can be reliably obtained between the first outer cut 321 and the exhaust port 2022. As a result, more of the ATF-air mixture is brought into contact with the cylindrical wall 30 and the peripheral wall portion 12, and accordingly, the gas liquid separation of the ATF-air mixture is facilitated.

Furthermore, the cylindrical wall 30 has a multi-cylinder structure that includes the inner cylindrical wall portion 31 and the outer cylindrical wall portion 32 as at least two cylindrical wall portions. The inner cylindrical wall portion 31 has the inner cut 311 as the cylindrical-wall-portion channel through which the space inside the inner cylindrical wall portion 31 and the space outside the inner cylindrical wall portion 31 communicate with each other. The outer cylindrical wall portion 32 has the first outer cut 321 as the cylindrical-wall-portion channel through which the space inside the outer cylindrical wall portion 32 and the space outside the outer cylindrical wall portion 32 communicate with each other. The first outer cut 321 as the cylindrical-wall-portion channel of the outermost outer cylindrical wall portion 32 is formed at a position spaced apart from the exhaust port 2022 by 90 degrees or larger around the axis of the outer cylindrical wall portion 32 as the center. The inner cut 311 of the inner cylindrical wall portion 31 as one cylindrical wall portion other than the outer cylindrical wall portion 32 which is the outermost cylindrical wall portion does not face the first outer cut 321 of the outer cylindrical wall portion 32 immediately outside the inner cylindrical wall portion 31 and faces the wall surface of the outer cylindrical wall portion 32 in the radial direction of the inner cylindrical wall portion 31.

Thus, a larger distance can be reliably obtained between the first outer cut 321 and the exhaust port 2022. As a result, more of the ATF-air mixture is brought into contact with the cylindrical wall 30 and the peripheral wall portion 12, and accordingly, the gas liquid separation of the ATF-air mixture is facilitated.

The breather chamber structure 2 has the upper half 20 and the lower half 10. An upper end portion of the connecting portion 16 is open upward in the lower half 10. The cylindrical wall 30 extends downward from the upper half 20, and the opening at the other end portion of the cylindrical wall 30 faces the communication hole 14 at the upper end portion of the connecting portion 16. The upper half 20 has the exhaust port 2022 through which separated air inside the breather chamber structure 2 is discharged to the outside of the breather chamber structure 2 and which is formed at a position different from a position of the communication hole 14 at the upper end portion of the connecting portion 16 when seen in an up-down direction. Accordingly, the occurrences of a situation in which the ATF-air mixture having flowed through the communication hole 14 into the breather chamber structure 2 is directly discharged through the exhaust port 2022 can be suppressed. Furthermore, since the cylindrical wall 30 extends from the upper half 20, the rigidity of the upper half 20 is increased.

Furthermore, the upper half 20 has the first extension 2010 formed so as to approach the lower half 10. The first outer cut 321 is open toward the first extension 2010 so that the ATF-air mixture flows from the first outer cut 321 in a direction along the first extension 2010. Accordingly, the area of an inner surface of the upper half 20 can be increased. This can increase the area in which the ATF-air mixture is brought into contact with the upper half 20. This facilitates the gas liquid separation of the ATF-air mixture. Furthermore, the rigidity of part of the upper half 20 where the first extension 2010 is provided is increased.

Furthermore, the lower half 10 is engaged with the attachment 1011 of the casing 101. The lower half 10 is closed by the upper half 20 and the upper half 20 is secured to the casing 101. Thus, the breather 1 is reliably attached to the casing 101, and accordingly, the gas liquid separation of the ATF-air mixture is sufficiently performed by the breather 1. This suppresses the occurrences of breather blow caused by, for example, degradation of defoaming performance of the ATF in the casing 101 of the transaxle 100 and allows airflow between the inside and outside of the casing 101 to be performed through the breather chamber structure 2 of the breather 1.

The present disclosure is not limited to the above-described embodiment and includes variations and modifications within the gist of the present disclosure. For example, structures of elements of the breather are not limited to those of the breather 1 according to the present embodiment. Specifically, for example, the cylindrical wall, the cylindrical wall portions of the cylindrical wall, and the cylindrical-wall channel are not limited to the structures of the cylindrical wall 30, the inner cylindrical wall portion 31, the outer cylindrical wall portion 32, the inner cut 311, and the first outer cut 321.

Furthermore, although the cylindrical wall 30 has a multi-cylinder structure that includes two cylindrical wall portions, this structure is not limiting. For example, the cylindrical wall may have a multi-cylinder structure that includes three or four cylindrical wall portions. Alternatively, the cylindrical wall does not necessarily have a multi-cylinder structure and may include a single cylindrical wall portion.

What is claimed is:

1. A vehicle comprising a breather, the breather comprising:
    a breather chamber configured to allow airflow between an inside and an outside of a casing of an on-vehicle power unit or a transmission mechanism connected to the power unit through the breather chamber;

a tubular connecting portion provided with the casing and configured to introduce a fluid from the inside of the casing into the breather chamber through the tubular connecting portion; and a cylindrical wall provided in the breather chamber and formed in a cylindrical shape having one closed end portion and another open end portion that is opened toward the tubular connecting portion such that the fluid from the tubular connecting portion flows into an inside of the cylindrical wall through the another open end portion arrives at the one closed end portion and returns into the casing from the inside of the cylindrical wall through the another open end portion, wherein the tubular connecting portion has an upper end which is opened at a position below the another open end portion of the cylindrical wall in an upper direction which is defined as a direction from the tubular connecting portion toward the one closed end portion of the cylindrical wall.

2. The vehicle according to claim 1, the breather chamber has a bottom plate portion in which the tubular connecting portion is disposed, the upper end of the tubular connecting portion does not protrude above the bottom plate portion and thus is positioned below the bottom plate portion in the upper direction.

3. The vehicle according to claim 1, wherein the cylindrical wall has a cutout portion which forms a cylindrical-wall channel which allows an inner space of the cylindrical wall and an outside thereof to communicate with each other.

4. The vehicle according to claim 3, wherein the breather chamber has an outlet through which a gas separated from the fluid inside the breather chamber is discharged to an outside of the breather chamber, and wherein the cylindrical-wall channel is formed at a position spaced apart from the outlet by 90 degrees or larger around an axial center of the cylindrical wall when viewed from an axial direction thereof.

5. The vehicle according to claim 4, wherein the cylindrical wall has a multi-cylinder structure that comprises at least two cylindrical wall portions including a first outermost cylindrical wall portion and a second cylindrical wall portion located inside the first outermost cylindrical wall portion, wherein each of the at least two cylindrical wall portions has the cutout portion which forms a cylindrical-wall-portion channel which allows the inside of the cylindrical wall portion and the outside of the cylindrical wall portion to communicate with each other, wherein the cylindrical-wall-portion channel of the first outermost cylindrical wall portion is formed at the position spaced apart from the outlet by 90 degrees or larger around the axial center of the first outermost cylindrical wall portion, and wherein the cylindrical-wall-portion channel of the second cylindrical wall portion does not face the cylindrical-wall-portion channel of the first outmost cylindrical wall portion or of another cylindrical wall portion located immediately outside the second cylindrical wall portion and faces a cylindrical side wall of the first outmost cylindrical wall portion or of the another cylindrical wall portion in a radial direction thereof.

6. The vehicle according to claim 3, wherein the breather chamber is formed of an upper half and a lower half, wherein an upper end of the connecting portion is opened upward in the lower half, wherein the cylindrical wall extends downward from the upper half, and the another open end portion of the cylindrical wall faces the upper opened end of the connecting portion, and wherein the upper half has an outlet through which a gas separated from the fluid inside the breather chamber is discharged to an outside of the breather chamber and which is formed at a position different from a position of the upper opened end of the connecting portion when seen in an up-down direction.

7. The vehicle according to claim 6, wherein the upper half has a downward portion formed so as to approach the lower half, and wherein the cylindrical-wall channel is opened toward the downward portion so as to cause the fluid to flow from the cylindrical-wall channel in a direction along the downward portion.

8. The vehicle according to claim 6, wherein the lower half is engaged with an attachment portion of the casing, and wherein the lower half is closed by the upper half and the upper half is secured to the casing.

* * * * *